United States Patent
Shirakawa et al.

(10) Patent No.: US 12,508,885 B2
(45) Date of Patent: Dec. 30, 2025

(54) REAR GATE STRUCTURE OF VEHICLE

(71) Applicant: SUBARU CORPORATION, Tokyo (JP)

(72) Inventors: Kouhei Shirakawa, Tokyo (JP); Naohisa Isobe, Tokyo (JP); Kenichirou Takahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/793,056

(22) Filed: Aug. 2, 2024

(65) Prior Publication Data

US 2025/0083502 A1 Mar. 13, 2025

(51) Int. Cl.
*B60J 5/10* (2006.01)

(52) U.S. Cl.
CPC ..................... *B60J 5/107* (2013.01)

(58) Field of Classification Search
CPC ............. B60J 5/107; B60J 5/101; B60J 5/10
See application file for complete search history.

(56) References Cited

U.S. PATENT DOCUMENTS

| | | | | |
|---|---|---|---|---|
| 7,306,279 B2 * | 12/2007 | Saitoh | ...................... | B60J 5/101 296/205 |
| 11,407,292 B2 * | 8/2022 | Kuntze | ................... | B60J 5/107 |
| 12,138,998 B2 * | 11/2024 | Notoya | ...................... | B60J 5/10 |
| 12,296,660 B2 * | 5/2025 | Nagano | ...................... | B60J 5/10 |
| 2024/0075795 A1 * | 3/2024 | Zhong | ...................... | B60J 5/107 |
| 2024/0157772 A1 * | 5/2024 | Kuntze | ................... | B60J 5/107 |

FOREIGN PATENT DOCUMENTS

| | | | |
|---|---|---|---|
| JP | 2011-136606 A | | 7/2011 |
| JP | 2020-001423 A | | 1/2020 |
| JP | 2021054141 A | * | 4/2021 |

OTHER PUBLICATIONS

JP2021054141A English translation from WIPO (Year: 2021).*

* cited by examiner

*Primary Examiner* — Janet M Wilkens
*Assistant Examiner* — Susan M. Heschel
(74) *Attorney, Agent, or Firm* — MCGINN I.P. LAW GROUP, PLLC

(57) ABSTRACT

A rear gate structure of a vehicle includes an outer panel, an inner panel, an outer peripheral skeleton part, and a stiffening plate. The outer panel constitutes an outer surface of the vehicle by the rear gate. The inner panel is provided inside the vehicle with respect to the outer panel. The outer peripheral skeleton part is formed on the inner panel along an outer peripheral edge of the inner panel. The stiffening plate overlaps the outer peripheral skeleton part. The stiffening plate has a curved long plate shape having an outer shape that is provided to overlap an upper corner portion of the outer peripheral skeleton part. A portion surrounded by a frame part includes a curved upper edge junction, a curved lower edge junction curved, and an outer edge connecting surface portion and an inner edge connecting surface portion.

16 Claims, 9 Drawing Sheets

REAR GATE STRUCTURE OF VEHICLE

CROSS-REFERENCE TO RELATED APPLICATIONS

The present application claims priority from Japanese Patent Application No. 2023-145319 filed on Sep. 7, 2023, the entire contents of which are hereby incorporated by reference.

BACKGROUND

The disclosure relates to a rear gate structure of a vehicle.

Some vehicles such as automobiles have a rear gate that opens and closes with respect to a rear opening of a vehicle body.

In the rear gate, it is desirable that an outer panel has a shape conforming to the design of the vehicle, and thus it is difficult to form a skeleton structure for deforming the panel into a hat cross-sectional shape or the like on both an inner panel and an outer panel.

Thus, in the rear gate, basically, the inner panel is deformed into the hat cross-sectional shape or the like, and the skeleton structure is provided only in the inner panel (See for example, Japanese Unexamined Patent Application Publication Nos. 2020-001423, 2021-054141, and 2011-136606).

SUMMARY

An aspect of the disclosure provides a rear gate structure of a vehicle. The rear gate structure being configured to open and close a rear opening of a vehicle body of the vehicle. The rear gate structure includes an outer panel, an inner panel, an outer peripheral skeleton part, and a stiffening plate. The outer panel constitutes an outer surface of the vehicle by the rear gate. The inner panel is provided inside the vehicle with respect to the outer panel, at least an outer peripheral edge of the inner panel being joined to the outer panel. The outer peripheral skeleton part is formed on the inner panel along an outer peripheral edge of the inner panel. The stiffening plate overlaps the outer peripheral skeleton part. The stiffening plate has a curved long plate shape having an outer shape that is provided so as to overlap an upper corner portion of the outer peripheral skeleton part and is curved along the upper corner portion of the outer peripheral skeleton part. The stiffening plate is provided with a curved recess that is formed by curving, in a recessed shape, a portion surrounded by a frame part including a curved upper edge junction curved at an upper edge in the curved long plate shape, a curved lower edge junction curved at a lower edge in the curved long plate shape, and an outer edge connecting surface portion and an inner edge connecting surface portion serving as both edges in a longitudinal direction in the curved long plate shape. The curved upper edge junction is joined to an outer adjacent portion of the inner panel adjacent to the outer peripheral skeleton part, at least in a portion on an extension of the outer edge connecting surface portion and a portion on an extension of the inner edge connecting surface portion. The curved lower edge junction is joined to an inner adjacent portion of the inner panel adjacent to the outer peripheral skeleton part, at least in a portion on the extension of the outer edge connecting surface portion and the portion on the extension of the inner edge connecting surface portion.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
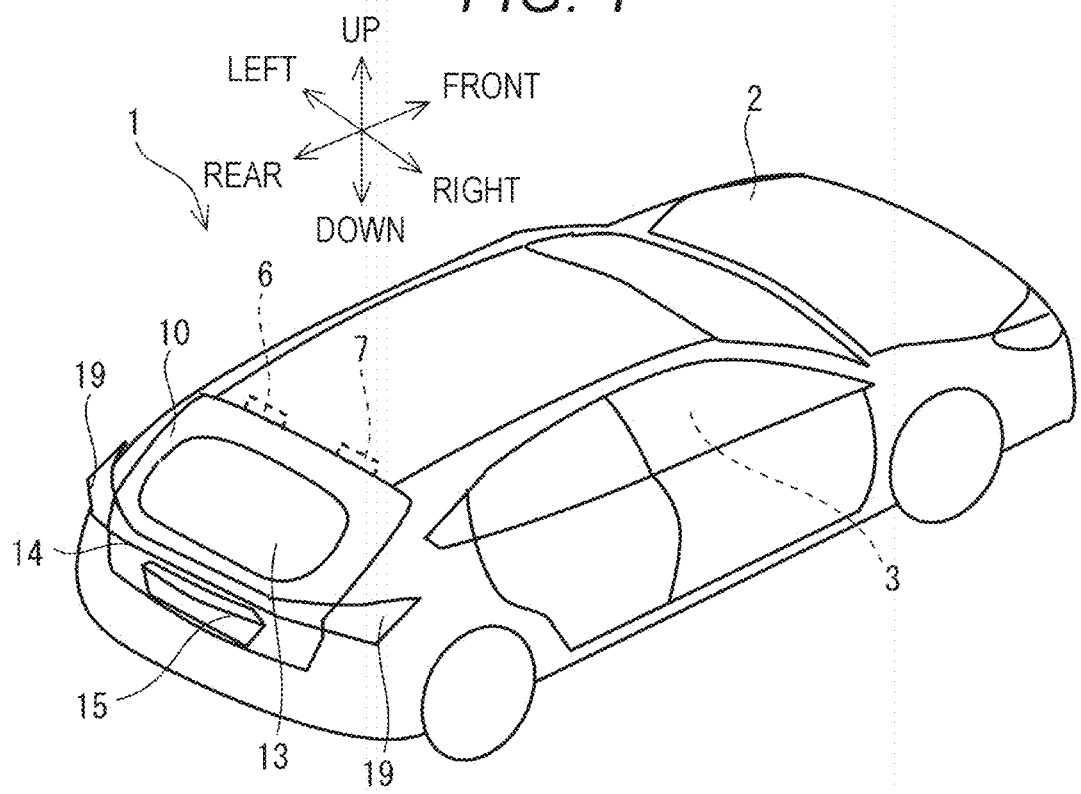
FIG. 1 is a perspective view of an automobile according to an embodiment of the disclosure.

Even if a skeleton structure of a rear gate is formed by deforming an inner panel to increase rigidity, it is not easy to obtain high rigidity, for example, when a hat cross-sectional shape of the inner panel and a hat cross-sectional shape of an outer panel are overlapped.

As a result, the rear gate may give an impression of insufficient rigidity to an occupant who opens and closes the rear gate.

In the following description, up-down, left-right, and front-rear directions refer to directions in the vehicle in a state where the rear gate is closed.

For example, when closing an open rear gate, the occupant pulls down a lower edge of the open rear gate by hand. In order to provide rear glass in the rear gate, glass openings are formed in an upper portion of the inner panel and an upper portion of the outer panel. In an upper portion of the rear gate, a skeleton part extending vertically on both left and right sides of the glass opening is formed only in the inner panel. In this case, an input to the lower edge of the rear gate may cause the upper portion of the rear gate to bend and flex. In addition, the input to the lower edge of the rear gate may cause a lower portion of the rear gate to flex in such a manner as to bend relative to the upper portion of the rear gate.

Other than this, for example, there is a possibility that a force in a vehicle width direction of the vehicle is input to the open rear gate from the side. Such a lateral input is a force that rotates the rear gate in a plane of the rear gate. As a result, the rear gate may flex in such a manner that its entirety deforms from a quadrangle to a parallelogram. In addition, when the force for rotating the rear gate in a plane is input, an undesirable force in a direction different from a movable direction thereof may act on a cylinder member connecting left and right edges of the rear gate and the vehicle body and hinge members supporting an upper edge of the rear gate so as to be openable and closable to the vehicle body.

As described above, the rear gate of the vehicle is required to increase rigidity of the rear gate while ensuring the design of the rear gate.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

FIG. 1 is a perspective view of an automobile 1 according to the embodiment of the disclosure.

Figure 2:
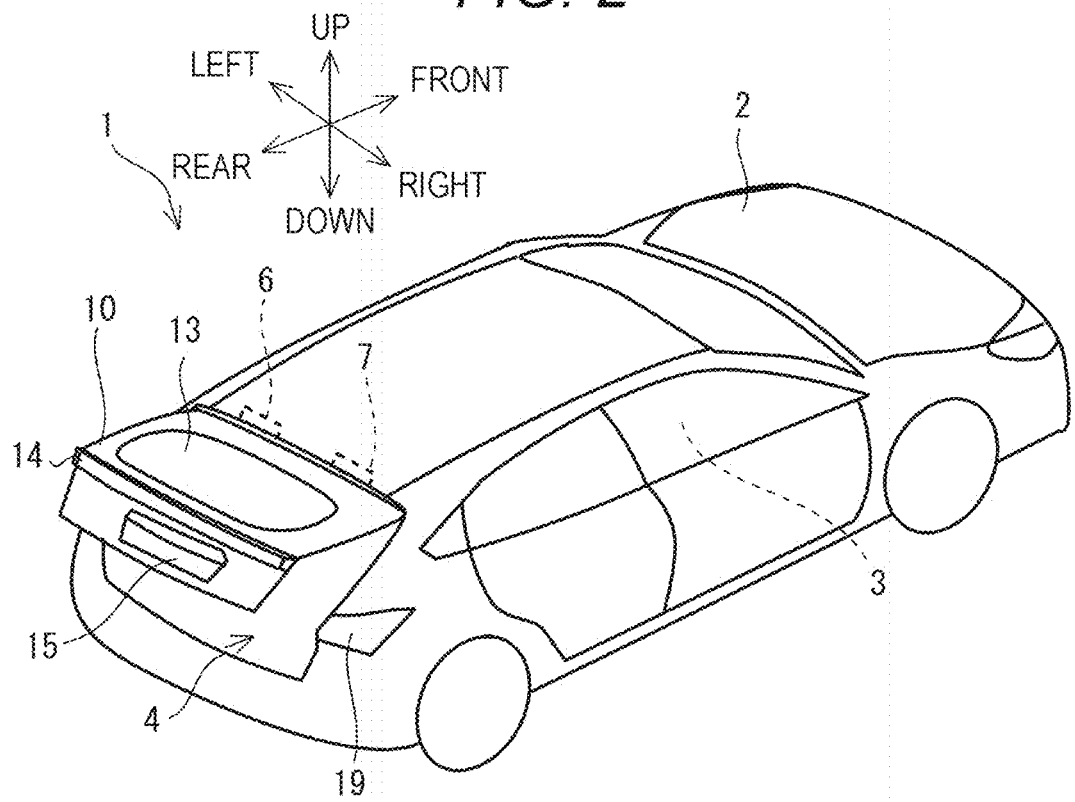
FIG. 2 is a view illustrating a state in which a rear gate of the automobile in FIG. 1 is opened.

FIG. 2 is a view illustrating a state in which a rear gate 10 of the automobile 1 in FIG. 1 is opened.

In the present embodiment, front-rear, left-right, and up-down directions are indicated in a state in which the rear gate 10 is closed as illustrated in FIG. 1. Further, the vehicle width direction of the automobile 1 refers to a left-right direction.

An automobile 1 in FIGS. 1 and 2 is an example of a "vehicle". The automobile 1 has a vehicle body 2 in which a cabin is defined. The automobile 1 includes doors for allowing an occupant to get on and off the cabin, and the rear gate 10 for accessing a luggage room which is a rear portion of the cabin. An upper edge portion of the rear gate 10 is attached to a roof of the vehicle body 2 by a left hinge member 6 and a right hinge member 7. As illustrated in FIGS. 1 and 2, the rear gate 10 can be opened and closed with respect to the rear opening 4 of the vehicle body 2.

When the rear gate 10 is opened, the rear opening 4 appears in the vehicle body 2 of the automobile 1 as illustrated in FIG. 2. The occupant can take in and out luggage in the luggage room from the rear opening 4.

Further, the occupant pulls down and closes the open rear gate 10. The rear opening 4 of the vehicle body 2 of the automobile 1 is closed. The luggage in the luggage room does not fall off from the rear opening 4.

Note that the appearance of the automobile 1 illustrated in FIGS. 1 and 2 is a preferable design in which a curved surface shape is frequently used including an outer surface of the rear gate 10. The rear gate 10 is in harmony with left and right tail lamp members 19, which are other parts of the automobile 1, and the design of the automobile 1 is unified as a whole.

Figure 3:
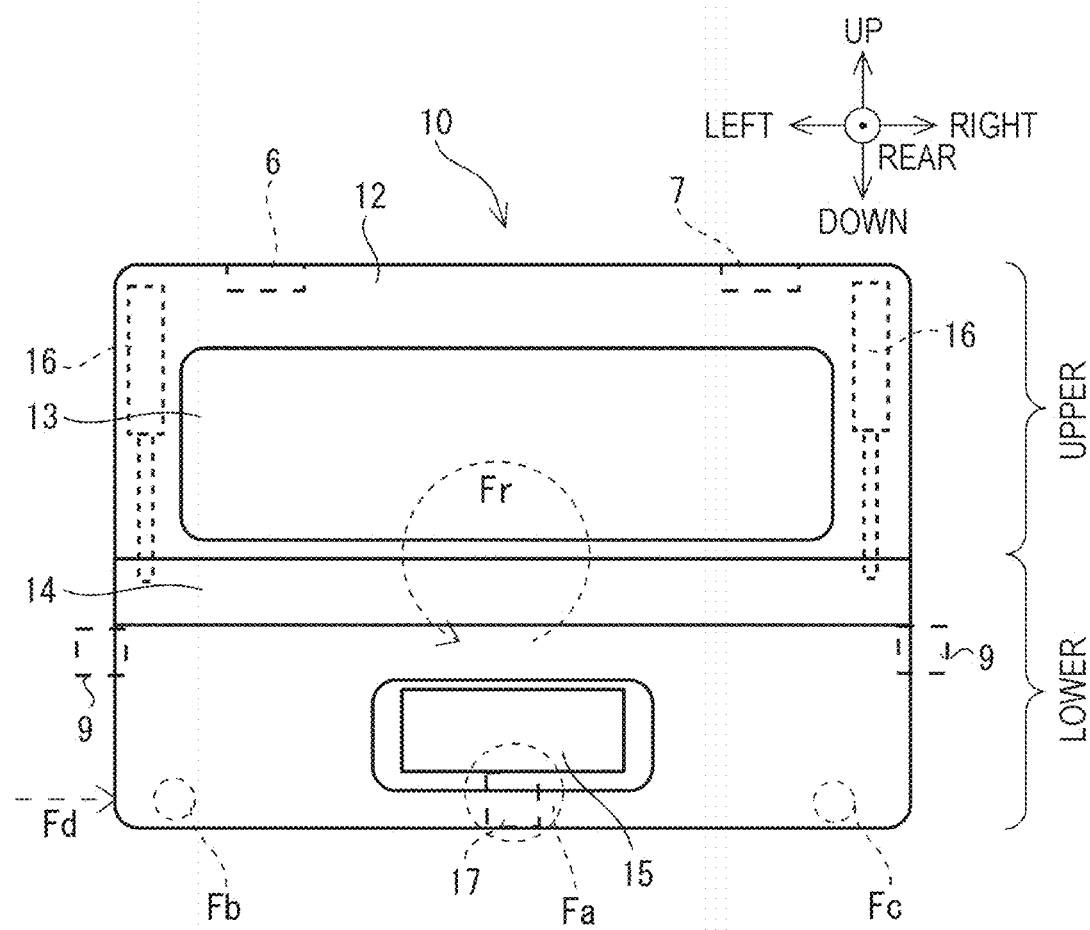
FIG. 3 is a schematic explanatory view of the rear gate of FIG. 1 as viewed from behind.

FIG. 3 is a schematic explanatory view of the rear gate 10 of FIG. 1 as viewed from the rear.

Figure 4:
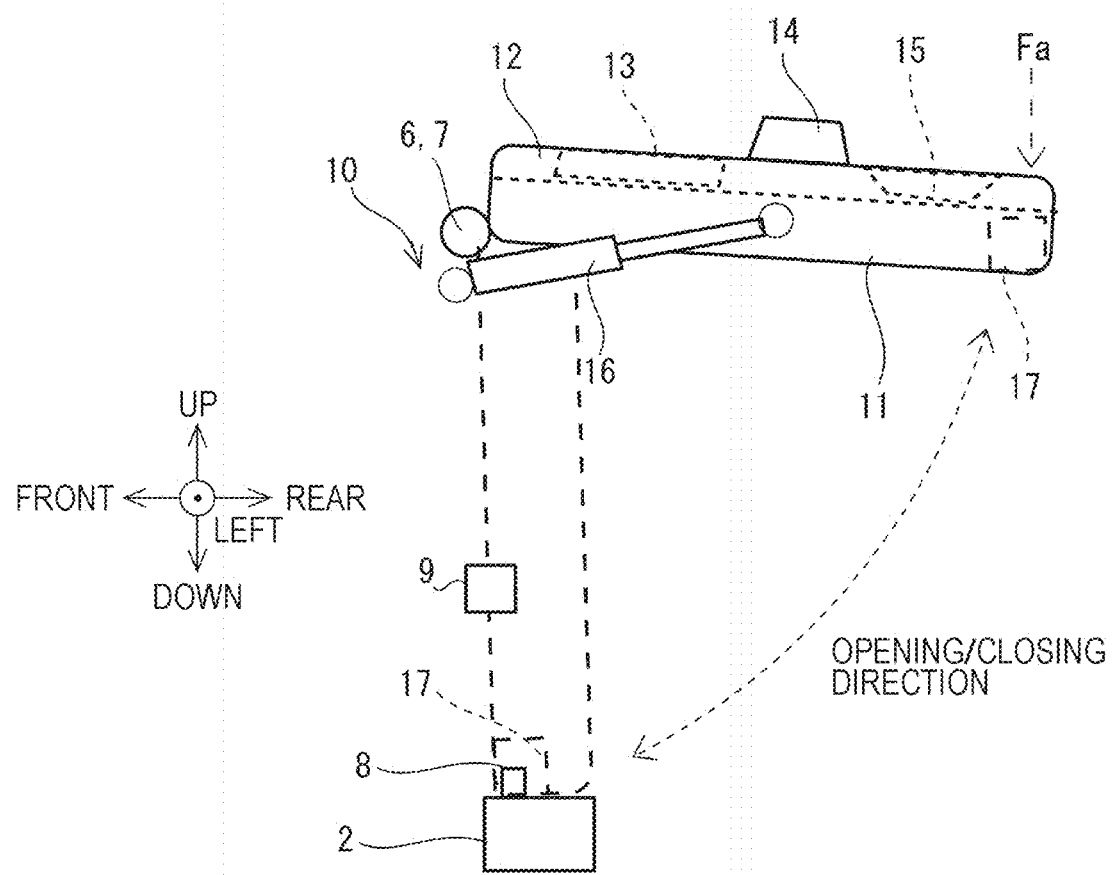
FIG. 4 is an explanatory view of a schematic open/close state of the rear gate of FIG. 3.

FIG. 4 is an explanatory view of a schematic open/close state of the rear gate 10 of FIG. 3.

As illustrated in FIG. 4, the rear gate 10 of the automobile 1 includes an outer panel 12 and an inner panel 11.

As schematically illustrated in FIG. 3, the outer panel 12 may have a shape based on a substantially quadrangular outer shape.

The inner panel 11 is provided on the front side of the automobile 1 with respect to the outer panel 12. The inner panel 11 may be formed in a substantially quadrangular outer shape similar to that of the outer panel 12.

The outer panel 12 and the inner panel 11 are formed in substantially the same outer shape, and outer peripheral edges thereof are joined to each other. Thus, a basic structure of the rear gate 10 is formed.

The left hinge member 6 and the right hinge member 7 are attached to the upper edge of the rear gate 10. The rear gate 10 is pivotally supported by the left hinge member 6 and the right hinge member 7 so as to be openable and closable with respect to the rear opening 4 of the vehicle body 2.

A left cylinder member 16 as a coupling member is provided at the left edge of the rear gate 10. An upper end of the left cylinder member 16 is attached to the vehicle body 2. A lower end of the left cylinder member 16 is attached to a central portion in the up-down direction of the left edge of the rear gate 10.

A right cylinder member 16 as a coupling member is provided at the right edge of the rear gate 10. An upper end of the right cylinder member 16 is attached to the vehicle body 2. A lower end of the right cylinder member 16 is attached to a central portion in the up-down direction of the right edge of the rear gate 10.

When the rear gate 10 is opened as illustrated in FIG. 2, the left cylinder member 16 and the right cylinder member 16 support either the left or right edge of the rear gate 10 on the vehicle body 2 of the automobile 1. Thus, even when the hand is released from the rear gate 10, the rear gate 10 can be maintained in the open state.

A striker member 17 is provided at a lower edge of the rear gate 10. The striker member 17 is provided at a center in the left-right direction with respect to the lower edge of the rear gate 10. Further, as illustrated in FIG. 4, the vehicle body 2 is provided with a latch member 8 at a lower central portion of the rear opening 4.

When the rear gate 10 is closed, the striker member 17 is engaged with the latch member 8 as indicated by an alternate long and short dash line in FIG. 4. Thus, the rear gate 10 can be maintained in a closed state.

Further, as illustrated in FIG. 3, the vehicle body 2 is provided with a pair of elastic members 9. The pair of elastic members 9 is provided at a central portion in the up-down direction at the left edge and the right edge of the rear opening 4 of the vehicle body 2. Thus, the left edge and the right edge of the closed rear gate 10 hit the pair of elastic members 9. The closed rear gate 10 is less likely to rattle due to vibration or the like during traveling of the automobile 1.

In the outer panel 12, as illustrated in FIG. 3, a rear glass 13 is fitted into an upper glass opening portion, and a plate attachment surface 15 for attaching a license plate is formed at a lower center. Further, a garnish member 14 is attached between the rear glass 13 and the plate attachment surface 15. The garnish member 14 of the present embodiment is formed to have a width similar to that of the outer panel 12, and is attached to the outer panel 12 so as to cross the entire width in the left-right direction at a center in the up-down direction of the outer panel 12. The left and right tail lamp members 19 are provided on left and right sides of the garnish member 14 of the vehicle body 2.

Then, the outer panel 12 and the garnish member 14 are formed in a curved shape in which a central portion in the vehicle width direction protrudes, for example, for a design of a rear surface of the automobile 1. The outer panel 12, together with the garnish member 14 and the left and right tail lamp members 19, is designed in a shape conforming to the design of the automobile 1 in order to constitute an outer surface on the rear side of the automobile 1 by the rear gate 10.

Thus, in the rear gate 10, the inner panel 11 is basically deformed into a hat cross-sectional shape or the like, and the skeleton structure is basically provided only on the inner panel 11.

In the rear gate 10, it is difficult to form a skeleton structure for deforming the panel into a hat cross-sectional shape or the like on both the inner panel 11 and the outer panel 12.

For this reason, there is a possibility that the rear gate 10 gives an impression of insufficient rigidity to an occupant or the like who opens and closes the rear gate 10.

For example, when closing the open rear gate 10, the occupant pulls down the lower edge central portion of the open rear gate 10 by hand, as indicated by a force Fa in FIGS. 3 and 4. In the rear gate 10, a glass opening is formed in the upper portion of the inner panel 11 and the upper portion of the outer panel 12 in order to provide the rear glass 13.

The input of the lower edge central portion of the rear gate 10 may cause the rear gate 10 to flex in such a manner that its lower portion bends relative to its upper portion.

In addition, in the upper portion of the rear gate 10, when the skeleton part is formed only in the inner panel 11 vertically on both left and right sides of the glass opening, the upper portion of the rear gate 10 itself can be bent and bent by the input of the lower edge central portion of the rear gate 10.

Other than this, for example, when closing the open rear gate 10, the occupant may pull down a lower edge left end portion or a lower edge right end portion like a force Fb or a force Fc of FIG. 3 instead of a lower edge central portion of the rear gate 10 like the force Fa of FIGS. 3 and 4. The left and right portions of the lower portion of the rear gate 10 may flex so as to be twisted relative to, for example, a central portion of the lower portion of the rear gate 10.

In addition, due to an input of a rotational force around upper and lower axes at the center in the vehicle width direction with respect to the rear gate 10, an undesirable force in a direction different from a movable direction may act on the left cylinder member 16 and the right cylinder member 16 coupling the left and right edges of the rear gate 10 and the vehicle body 2. Similarly, an undesirable force in a direction different from the movable direction may also act on the left hinge member 6 and the right hinge member 7 that support the upper edge of the rear gate 10 so as to be openable and closable to the vehicle body 2.

Other than this, for example, there is a possibility that a force in the vehicle width direction of the automobile 1, such as a force Fd in FIG. 3, is input from a side to the open rear gate 10. Such a lateral input Fd may generate a force Fr that rotates the rear gate 10 in the plane of the rear gate 10. As a result, the rear gate 10 may flex in such a manner that its entirety deforms from a quadrangle to a parallelogram.

In addition, when the force Fr for rotating the rear gate 10 in the plane is input, an undesirable force in a direction different from the movable direction thereof may act on the left cylinder member 16 and the right cylinder member 16 couple the left and right edges of the rear gate 10 and the vehicle body 2. Similarly, an undesirable force in a direction different from the movable direction of the left hinge member 6 and the right hinge member 7 that support the upper edge of the rear gate 10 to the vehicle body 2 so as to be openable and closable may act on the left hinge member 6 and the right hinge member 7.

As described above, the rear gate 10 of the automobile 1 is required to increase rigidity so that the rear gate 10 does not flex or is not bent while ensuring the design of the rear gate 10.

Figure 5:
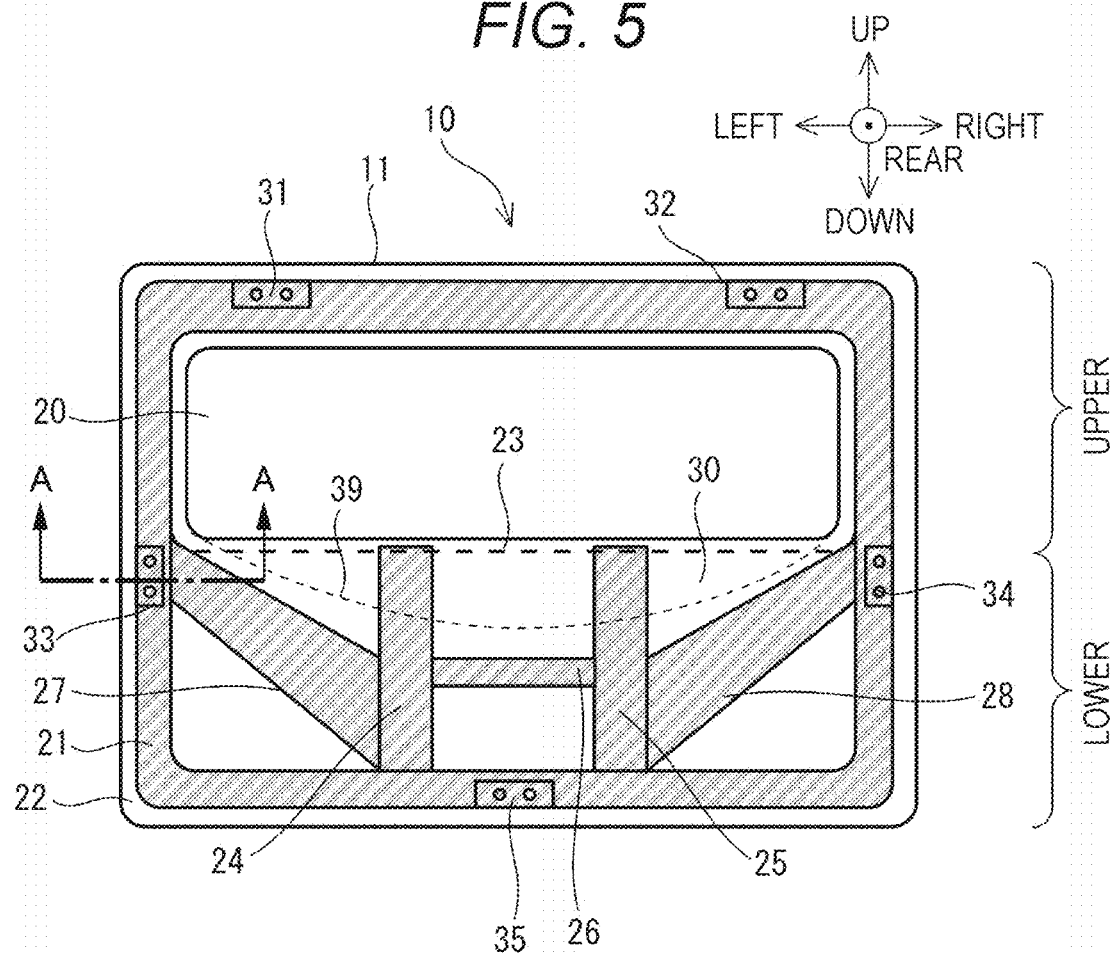
FIG. 5 is a schematic explanatory view of an inner panel of the rear gate of FIG. 1 as viewed from behind.

FIG. 5 is a schematic explanatory view of the inner panel 11 of the rear gate 10 of FIG. 1 as viewed from the rear.

A glass opening 20 in which the rear glass 13 overlaps is formed in an upper portion of the inner panel 11 of the present embodiment. Further, in the inner panel 11, an auxiliary panel 30 joined to the inner panel 11 is provided below the glass opening 20.

A window peripheral edge 23 that is a peripheral edge portion around the glass opening 20 is joined to a window peripheral edge that is a peripheral edge portion around the glass opening of the outer panel 12.

Then, in the inner panel 11, an outer peripheral skeleton part 21, a left longitudinal inner skeleton part 24, a right longitudinal inner skeleton part 25, a central connecting skeleton part 26, a left oblique inner skeleton part 27, and a right oblique inner skeleton part 28 are formed as skeleton parts. The skeleton parts are formed in the inner panel 11 by extruding a steel plate for the inner panel 11 by press working to be deformed into a hat cross-sectional shape.

The outer peripheral skeleton part 21 is formed in the inner panel 11 along the outer peripheral edge of the substantially rectangular inner panel 11. The outer peripheral skeleton part 21 is formed in an annular shape along the outer peripheral edge of the substantially rectangular inner panel 11.

Then, a left cylinder attachment part 33, a right cylinder attachment part 34, a striker attachment part 35, a left hinge attachment part 31, and a right hinge attachment part 32 are disposed in the outer peripheral skeleton part 21.

The left cylinder attachment part 33 is a portion for attaching the left cylinder member 16 to a center of a left edge of the inner panel 11 of the rear gate 10 by screwing.

The right cylinder attachment part 34 is a portion for attaching the right cylinder member 16 to a center of a right edge of the inner panel 11 of the rear gate 10 by screwing.

The striker attachment part 35 is a portion for attaching the striker member 17 to the center of the lower edge of the inner panel 11 of the rear gate 10 by screwing.

The left hinge attachment part 31 is a portion for mounting the left hinge member 6 to a left side of an upper edge of the inner panel 11 of the rear gate 10 by screwing.

The right hinge attachment part 32 is a portion for mounting the right hinge member 7 to a right side of the upper edge of the inner panel 11 of the rear gate 10 by screwing.

The left longitudinal inner skeleton part 24 is formed at a lower portion of the inner panel 11 inside the outer peripheral skeleton part 21. The left longitudinal inner skeleton part 24 is formed vertically along the up-down direction in a left side portion of the lower portion of the inner panel 11. An upper end of the left longitudinal inner skeleton part 24 is connected to the window peripheral edge 23. A lower end of the left longitudinal inner skeleton part 24 is connected to the outer peripheral skeleton part 21.

The right longitudinal inner skeleton part 25 is formed at the lower portion of the inner panel 11 inside the outer peripheral skeleton part 21. The right longitudinal inner skeleton part 25 is formed vertically along the up-down direction in the right side portion of the lower portion of the inner panel 11. An upper end of the right longitudinal inner skeleton part 25 is connected to the window peripheral edge 23. The lower end of the right longitudinal inner skeleton part 25 is connected to the outer peripheral skeleton part 21.

The central connecting skeleton part 26 is formed at the lower portion of the inner panel 11 inside the outer peripheral skeleton part 21. The central connecting skeleton part 26 is formed laterally along the left-right direction in the lower portion of the inner panel 11. The left end of the central connecting skeleton part 26 is connected to the left longitudinal inner skeleton part 24. The right end of the central connecting skeleton part 26 is connected to the right longitudinal inner skeleton part 25.

The left oblique inner skeleton part 27 is formed at the lower portion of the inner panel 11 inside the outer peripheral skeleton part 21. The left oblique inner skeleton part 27 is formed obliquely so as to extend from a left side of a lower end of the left longitudinal inner skeleton part 24 toward an upper left direction in the lower portion of the inner panel 11. A lower end of the left oblique inner skeleton part 27 is connected to the left longitudinal inner skeleton part 24. The upper end of the left longitudinal inner skeleton part 24 is joined to the left edge center of the outer peripheral skeleton part 21.

The right oblique inner skeleton part 28 is formed at the lower portion of the inner panel 11 inside the outer peripheral skeleton part 21. The right oblique inner skeleton part 28 is formed obliquely so as to extend from a right side of a lower end of the right longitudinal inner skeleton part 25 toward an upper right direction in the lower portion of the inner panel 11. A lower end of the right oblique inner skeleton part 28 is connected to the right longitudinal inner skeleton part 25. The upper end of the right longitudinal inner skeleton part 25 is joined to a center of a right edge of the outer peripheral skeleton part 21.

Figure 6:
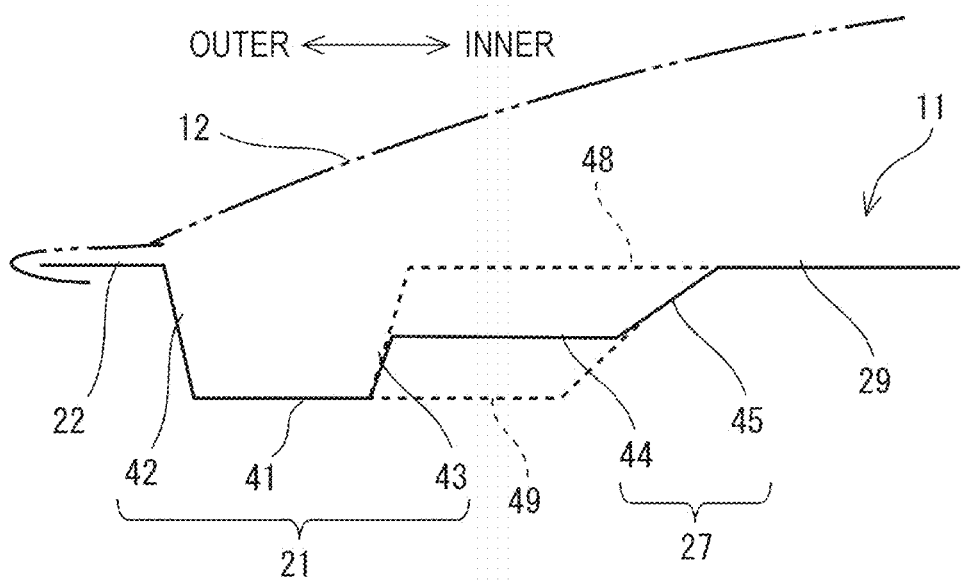
FIG. 6 is an A-A horizontal cross-sectional view of a left edge central portion of the inner panel of FIG. 5.

FIG. 6 is an A-A transverse cross-sectional view of a left edge central portion of the inner panel 11 of FIG. 5. FIG. 6 also illustrates the outer panel 12 of the rear gate 10.

Note that a right edge central portion of the inner panel 11 also has a cross section similar to that in FIG. 6, as illustrated in FIG. 6 reversed.

In FIG. 6, Inner is the right side, and Outer is the left side.

As illustrated in FIG. 6, the outer peripheral skeleton part 21 having the hat cross-sectional shape has an outer inclined surface 42, a bottom surface portion 41, and an inner inclined surface 43. Thus, a hat cross-sectional shape that can serve as a skeleton structure is obtained.

An outer peripheral edge 22 of the inner panel 11 is formed outside the outer inclined surface 42 of the outer peripheral skeleton part 21.

A bottom surface portion 44 of the left oblique inner skeleton part 27 is formed inside the inner inclined surface 43 of the outer peripheral skeleton part 21. In the A-A cross section, the left oblique inner skeleton part 27 has a bottom surface portion 44 and an inner inclined surface 45.

On the inside of the inner inclined surface 45 of the left oblique inner skeleton part 27, an inner portion 29 of the inner panel 11, which is on the inside of the left oblique inner skeleton part 27, is formed. In the example of FIG. 6, the inner portion 29 of the inner panel 11 has a non-bent planar surface shape by the inner panel 11 and the auxiliary panel 30.

As described above, in the present embodiment, various types of skeleton parts such as the left oblique inner skeleton part 27 are connected to the outer peripheral skeleton part 21 with a step inside the outer peripheral skeleton part 21.

Note that, in a portion different from the A-A cross section of FIG. 6, the inner skeleton part is not connected to the inside of the outer peripheral skeleton part 21. The cross section in this case is as indicated by a broken line 48 in FIG. 6. The outer inclined surface 42 and the inner inclined surface 43 of the outer peripheral skeleton part 21 have a hat cross-sectional shape opposite to the bottom surface portion 41.

On the other hand, unlike the present embodiment, it is also conceivable to align the bottom surface portion 41 of the left oblique inner skeleton part 27 flush with the bottom surface portion 41 of the outer peripheral skeleton part 21 as indicated by reference numeral 49 in FIG. 6. However, when the two bottom surface portions 41 are aligned flush with each other as described above, a wide bottom surface is formed by the bottom surface portions 41. The outer peripheral skeleton part 21 does not have the inner inclined surface 43 at the connecting portion where the wide bottom surface is formed. As a result, the rigidity of the portion of the inner panel 11 where the outer peripheral skeleton part 21 and the inner skeleton part are connected is less likely to increase even though the outer peripheral skeleton part 21 and the inner skeleton part are formed in the inner panel 11. The inner panel 11 has lower rigidity at a connecting portion between the outer peripheral skeleton part 21 and the inner skeleton part than at other portions where such connection is not made.

In the present embodiment, various types of skeleton parts such as the left oblique inner skeleton part 27 are connected to the outer peripheral skeleton part 21 with a step. Thus, in the present embodiment, also in the connecting portion, the cross-sectional shape of each skeleton part is left as much as possible to suppress the decrease in rigidity in the connecting portion. In the present embodiment, for example, rigidity that can be expected by forming the outer peripheral skeleton part 21 along the outer periphery of the inner panel 11 can be easily ensured.

Figure 7:
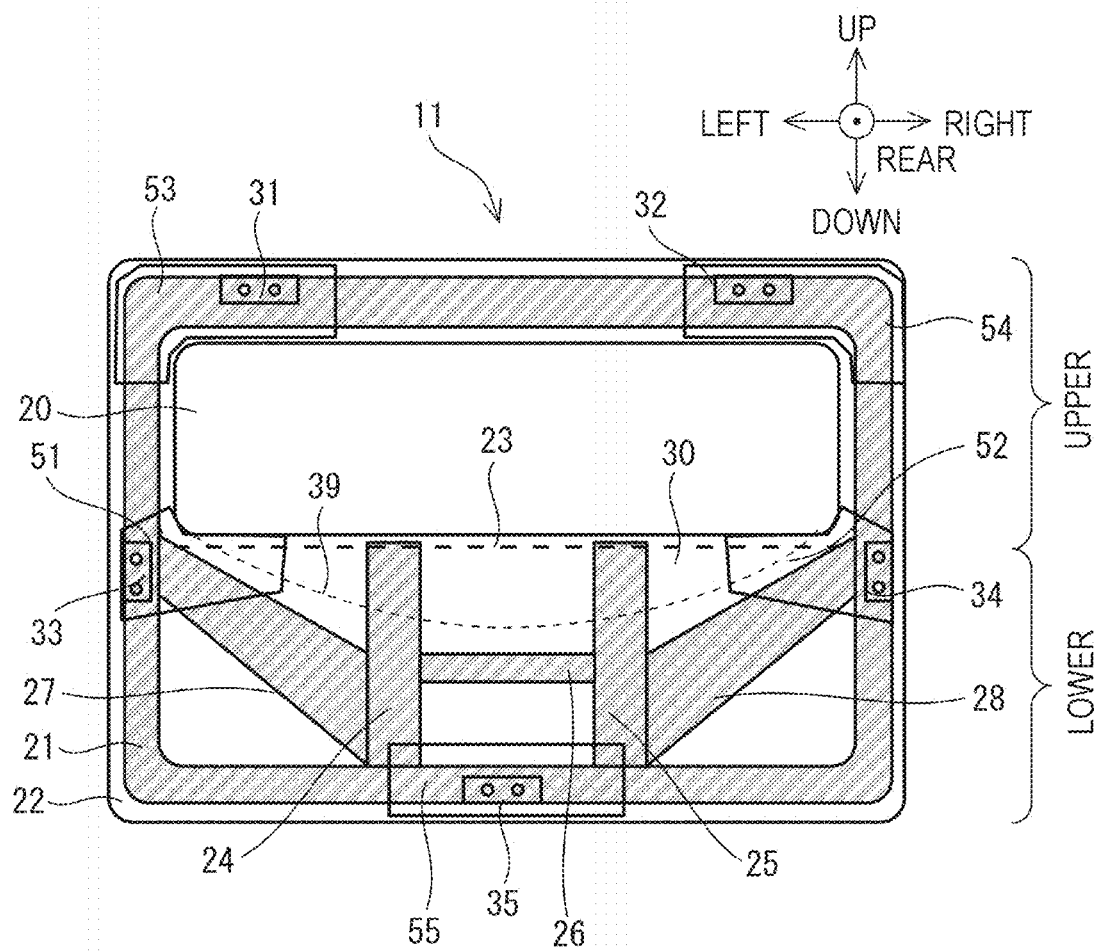
FIG. 7 is an explanatory view of stiffening plates provided for the inner panel of FIG. 5 in the embodiment.

FIG. 7 is an explanatory view of stiffening plates provided for the inner panel 11 of FIG. 5 in the present embodiment.

In the present embodiment, stiffening plates are provided for the inner panel 11 in order to stiffen the inner panel 11 to ensure desired rigidity as the rear gate 10.

FIG. 7 illustrates a left stiffening plate 51, a right stiffening plate 52, a lower stiffening plate 55, an upper left stiffening plate 53, and an upper right stiffening plate 54 as stiffening plates.

In this structure, the left stiffening plate 51, the right stiffening plate 52, and the lower stiffening plate 55 are overlapped on the connecting portion between the outer peripheral skeleton part 21 and the inner skeleton part.

The upper left stiffening plate 53 and the upper right stiffening plate 54 overlap the outer peripheral skeleton part 21.

The stiffening plates are joined to the inner panel 11 by spot welding or the like. The stiffening plates are sandwiched between the inner panel 11 and the outer panel 12 of the rear gate 10.

The left stiffening plate 51 is provided so as to overlap the connecting portion between the outer peripheral skeleton part 21 and an upper end portion of the left oblique inner skeleton part 27. Further, the left stiffening plate 51 overlaps the left cylinder attachment part 33 provided on the outer inclined surface 42 of the outer peripheral skeleton part 21. The left stiffening plate 51 is formed in a horizontally long substantially rectangular outer shape and size overlapping a range from the outer inclined surface 42 of the outer peripheral skeleton part 21 to the window peripheral edge 23 with respect to the inner panel 11.

The right stiffening plate 52 is provided so as to overlap the connecting portion between the outer peripheral skeleton part 21 and an upper end portion of the right oblique inner skeleton part 28. Further, the right stiffening plate 52 overlaps the right cylinder attachment part 34 provided on the outer inclined surface 42 of the outer peripheral skeleton part 21. The right stiffening plate 52 is formed in a horizontally long substantially rectangular outer shape and size overlapping a range from the outer inclined surface 42 of the outer peripheral skeleton part 21 to the window peripheral edge 23 with respect to the inner panel 11.

The lower stiffening plate 55 is provided so as to overlap a connecting portion between the outer peripheral skeleton part 21 and a lower end portion of the left longitudinal inner skeleton part 24 and a connecting portion between the outer peripheral skeleton part 21 and the right longitudinal inner skeleton part 25. Further, the lower stiffening plate 55 overlaps the striker attachment part 35 provided on the outer inclined surface 42 of the outer peripheral skeleton part 21. The lower stiffening plate 55 is formed in a horizontally long substantially rectangular outer shape and size overlapping a range from the lower end portion of the left longitudinal inner skeleton part 24 to the lower end portion of the right longitudinal inner skeleton part 25.

The upper left stiffening plate 53 is provided so as to overlap an upper left corner portion of the outer peripheral skeleton part 21 annularly formed along an outer edge of the inner panel 11. The upper left stiffening plate 53 has a curved long plate shape having an outer shape curved in a substantially L shape along the upper left corner portion of the outer peripheral skeleton part 21. A right edge portion of the upper left stiffening plate 53 having the curved long plate shape is closer to the center in the vehicle width direction than the left hinge attachment part 31. A curved distal left lower edge portion of the upper left stiffening plate 53 having the curved long plate shape is located to the left of the glass opening 20. The upper left stiffening plate 53 overlaps the left hinge attachment part 31 provided on the outer inclined surface 42 of the outer peripheral skeleton part 21.

The upper right stiffening plate 54 is provided so as to overlap an upper right corner portion of the outer peripheral skeleton part 21 formed annularly along the outer edge of the inner panel 11. The upper right stiffening plate 54 has a curved long plate shape having an outer shape curved in a substantially L shape along the upper right corner portion of the outer peripheral skeleton part 21. The left edge portion of the upper right stiffening plate 54 having the curved long plate shape is closer to the center in the vehicle width direction than the right hinge attachment part 32. A curved distal right lower edge portion of the upper right stiffening plate 54 having the curved long plate shape is located to the right of the glass opening 20. The upper right stiffening plate 54 overlaps the right hinge attachment part 32 provided on the outer inclined surface 42 of the outer peripheral skeleton part 21.

Figure 8:
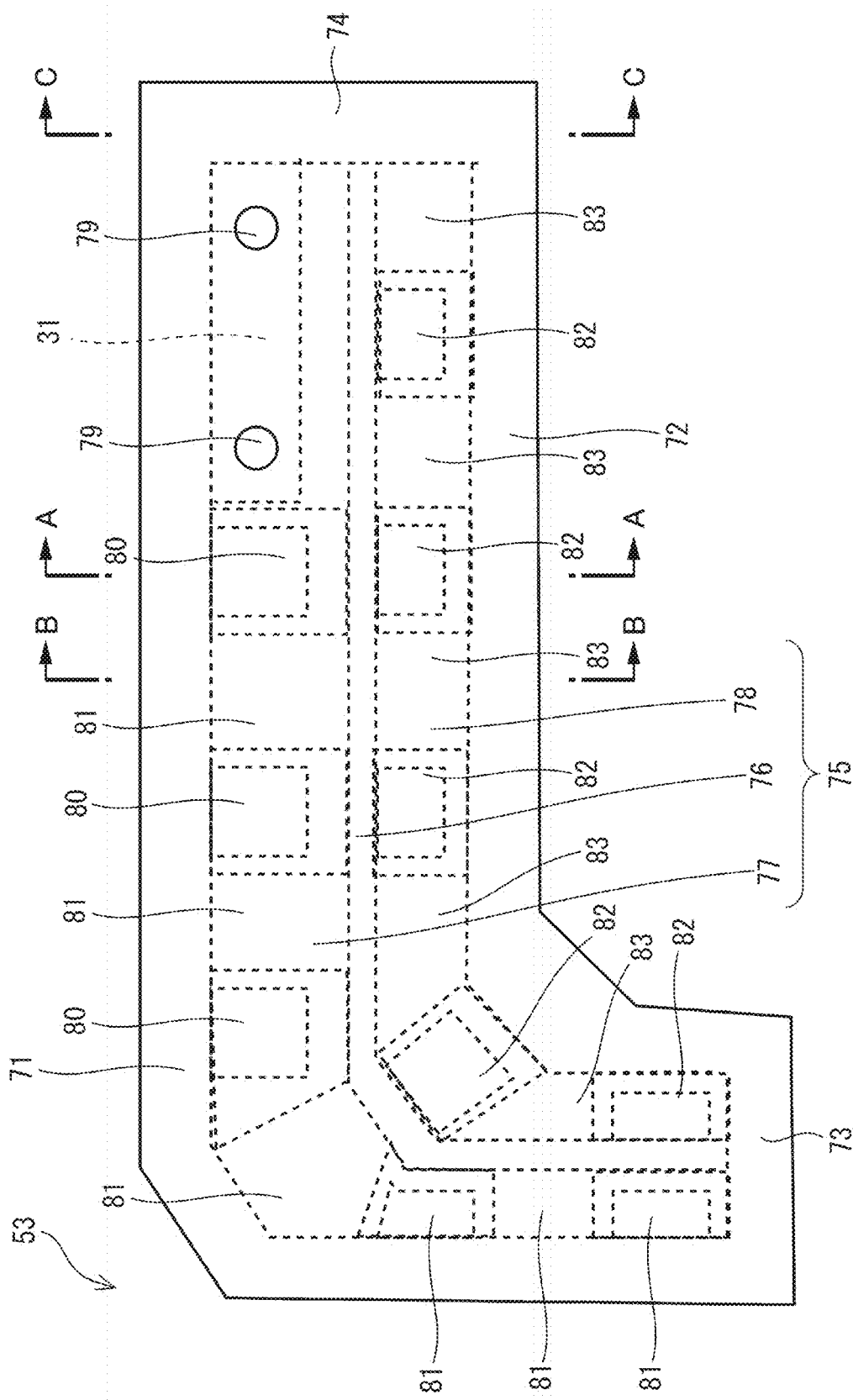
FIG. 8 is a schematic explanatory view of an upper left stiffening plate of FIG. 7.

FIG. 8 is a schematic explanatory view of the upper left stiffening plate 53 of FIG. 7.

The upper left stiffening plate 53 of FIG. 8 includes a curved upper edge junction 71, a curved lower edge junction 72, an outer edge connecting surface portion 73, an inner edge connecting surface portion 74, and a curved recess 75. The upper left stiffening plate 53 is provided so as to overlap the upper left corner portion of the outer peripheral skeleton part 21, and has a curved long plate shape having an outer shape curved in a substantially L shape along the upper left corner portion of the outer peripheral skeleton part 21. The upper left stiffening plate 53 may be formed to have the portions illustrated in FIG. 8 by, for example, extruding a steel plate having the outer shape of FIG. 8 by press working.

Similarly to FIG. 8, the upper right stiffening plate 54 also includes the curved upper edge junction 71, the curved lower edge junction 72, the outer edge connecting surface portion 73, the inner edge connecting surface portion 74, and curved recess 75. However, the arrangement is bilaterally symmetrical with FIG. 8.

The curved upper edge junction 71 is formed at an upper edge of the upper left stiffening plate 53 having the curved long plate shape.

The curved lower edge junction 72 is formed at a lower edge of the upper left stiffening plate 53 having the curved long plate shape.

The outer edge connecting surface portion 73 is formed at an outer edge curved toward a lower side of the upper left stiffening plate 53 having the curved long plate shape.

The inner edge connecting surface portion 74 is formed on an inner edge of the upper left stiffening plate 53 having the curved long plate shape.

The curved upper edge junction 71, the curved upper edge junction 71, the outer edge connecting surface portion 73, and the inner edge connecting surface portion 74 form a planar frame part on the entire outer periphery of the upper left stiffening plate 53 having the curved long plate shape.

The curved recess 75 is formed inside the frame of the frame part by the curved upper edge junction 71, the curved upper edge junction 71, the outer edge connecting surface portion 73, and the inner edge connecting surface portion 74 described above.

The curved recess 75 may be formed in the upper left stiffening plate 53 by curving a central portion of the upper left stiffening plate 53 having the curved long plate shape in a recessed shape by press working.

Such a curved recess 75 has a curved long plate shape following the outer shape of the upper left stiffening plate 53.

A curved step portion 76, a curved upper surface portion 77, and a curved lower surface portion 78 are formed in the curved recess 75 having the curved long plate shape.

In FIG. 8, the curved step portion 76 extends so as to be curved along the longitudinal direction of the curved recess 75 having a curved long plate shape. The curved step portion 76 forms a curved upper surface portion 77 and a curved lower surface portion 78 in the curved recess 75 having a curved long plate shape. The curved upper surface portion 77 and the curved lower surface portion 78 are formed at different depths by the curved step portion 76. Thus, the curved recess 75 is formed in a multistage structure of two stages.

In the curved upper surface portion 77 on an upper side of the curved step portion 76, a pair of screw holes 79 for screwing with the left hinge member 6 together with the left hinge attachment part 31 is formed in an inner portion overlapping the left hinge attachment part 31 of the inner panel 11.

Further, in the remaining portion of the curved upper surface portion 77, recesses 81 and protrusions 80 are formed in a bead shape alternately arranged along a longitudinal direction. Thus, the curved upper surface portion 77 basically has a recess-protrusion surface shape in which the recesses 81 and the protrusions 80 are alternately arranged in the longitudinal direction.

On the curved lower surface portion 78 on the lower side of the curved step portion 76, recesses 83 and protrusions 82 are formed in a bead shape alternately arranged along the longitudinal direction. Thus, the curved lower surface portion 78 basically has a recess-protrusion surface shape in which the recesses 83 and the protrusions 82 are alternately arranged in the longitudinal direction.

Note that the curved step portion 76 is interposed between the recess 81 of the curved upper surface portion 77 and the recess 83 of the curved lower surface portion 78. Thus, the recess 81 of the curved upper surface portion 77 and the recess 83 of the curved lower surface portion 78 have different heights.

Further, the curved step portion 76 is interposed between the protrusions 80 of the curved upper surface portion 77 and the protrusions 82 of the curved lower surface portion 78. Thus, the protrusions 80 of the curved upper surface portion 77 and the protrusion 82 of the curved lower surface portion 78 have different heights.

With such a three-dimensional structure, the upper left stiffening plate 53 is less likely to be twisted or bent.

Figure 9:
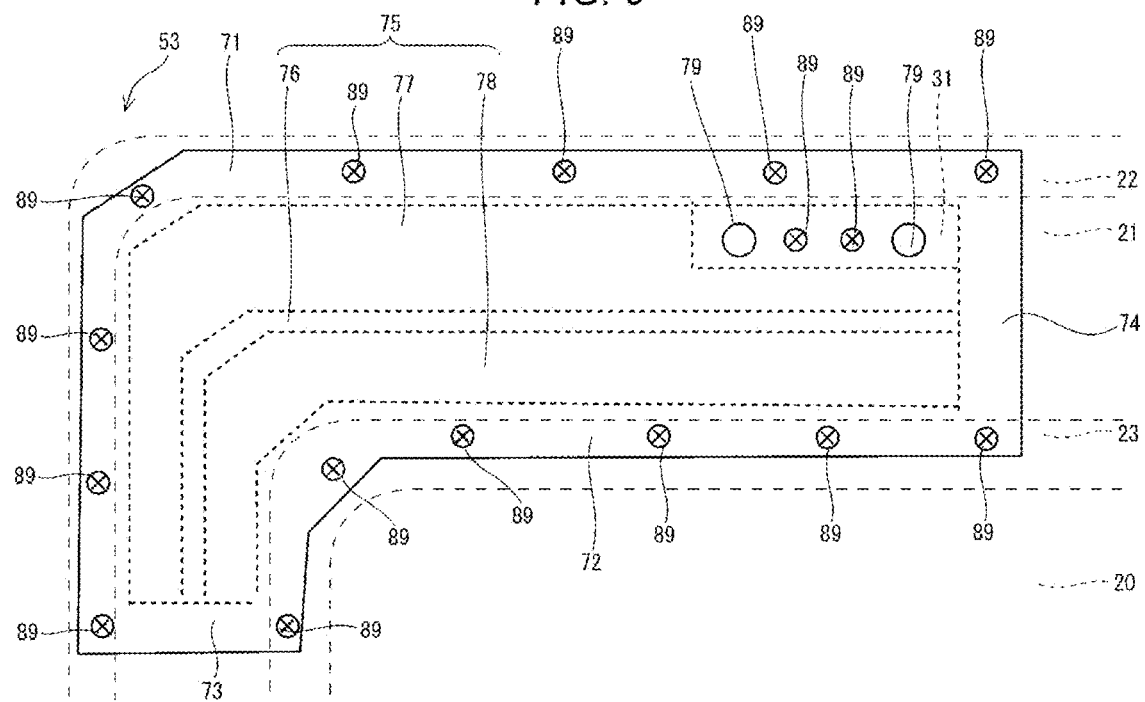
FIG. 9 is an explanatory view of a joint state between the upper left stiffening plate of FIG. 8 and the inner panel.

FIG. 9 is an explanatory view of a joint state between the upper left stiffening plate 53 and the inner panel 11 in FIG. 8.

Note that, in FIG. 9, the bead structure of the curved upper surface portion 77 and the bead structure of the curved lower surface portion 78 are omitted in order to make the drawing easily viewable.

The upper left stiffening plate 53 is provided from the upper left corner portion of the outer peripheral skeleton part 21 of the inner panel 11 to a portion overlapping the left hinge member 6. The upper left stiffening plate 53 is provided from the upper left corner portion of the outer peripheral skeleton part 21 to the attachment part of the left hinge member 6 so as to overlap the upper left corner portion of the outer peripheral skeleton part 21.

The curved upper edge junction 71 of the upper left stiffening plate 53 is provided along the outer inclined surface 42 of the outer peripheral skeleton part 21. The curved upper edge junction 71 overlaps the left hinge attachment part 31. The curved upper edge junction 71 overlapping the left hinge attachment part 31 is screwed to the left hinge member 6 together with the left hinge attachment part 31 formed on the outer inclined surface 42 of the outer peripheral skeleton part 21 of the inner panel 11.

The curved lower edge junction 72 overlaps an upper left corner portion of the window peripheral edge 23.

The upper right stiffening plate 54 is also provided from an upper right corner portion of the outer peripheral skeleton part 21 of the inner panel 11 to a portion overlapping the right hinge member 7 in a state as in FIG. 9.

In the overlapping state of FIG. 9, the upper left stiffening plate 53 and the inner panel 11 are joined by spot welding or the like.

FIG. 9 illustrates an example of junctions 89 between the upper left stiffening plate 53 and the inner panel 11.

In FIG. 9, the curved upper edge junction 71 is joined to an upper left corner portion of the outer peripheral edge 22 of the inner panel 11 at the junctions 89.

The curved lower edge junction 72 is joined to the upper left corner portion of the window peripheral edge 23 of the inner panel 11 at the junctions 89.

The curved recess 75 is joined to an outer inclined surface 42 which is an outer portion of the outer peripheral skeleton part 21 at two junctions 89 between the pair of screw holes 79 of the curved upper surface portion 77.

With the junctions 89 as illustrated in FIG. 9, the curved upper edge junction 71 is joined to the upper left corner portion of the outer peripheral edge 22 of the inner panel 11 at a portion on an extension of the outer edge connecting surface portion 73 and a portion on an extension of the inner edge connecting surface portion 74. The outer peripheral edge 22 is an outer adjacent portion adjacent to the outside of the outer peripheral skeleton part 21.

The curved lower edge junction 72 is joined to the upper left corner portion of the window peripheral edge 23 of the inner panel 11 at the portion on the extension of the outer edge connecting surface portion 73 and the portion on the extension of the inner edge connecting surface portion 74. The window peripheral edge 23 is an inner adjacent portion adjacent to the inside of the outer peripheral skeleton part 21.

Thus, the outer edge connecting surface portion 73 having a basically flat plate shape can connect the junction 89 on the lower side and the junction 89 on the upper side with high rigidity due to a linear shape.

The inner edge connecting surface portion 74 having a basically flat plate shape can connect the junction 89 on the lower side and the junction 89 on the upper side with high rigidity due to the linear shape.

Figure 10:
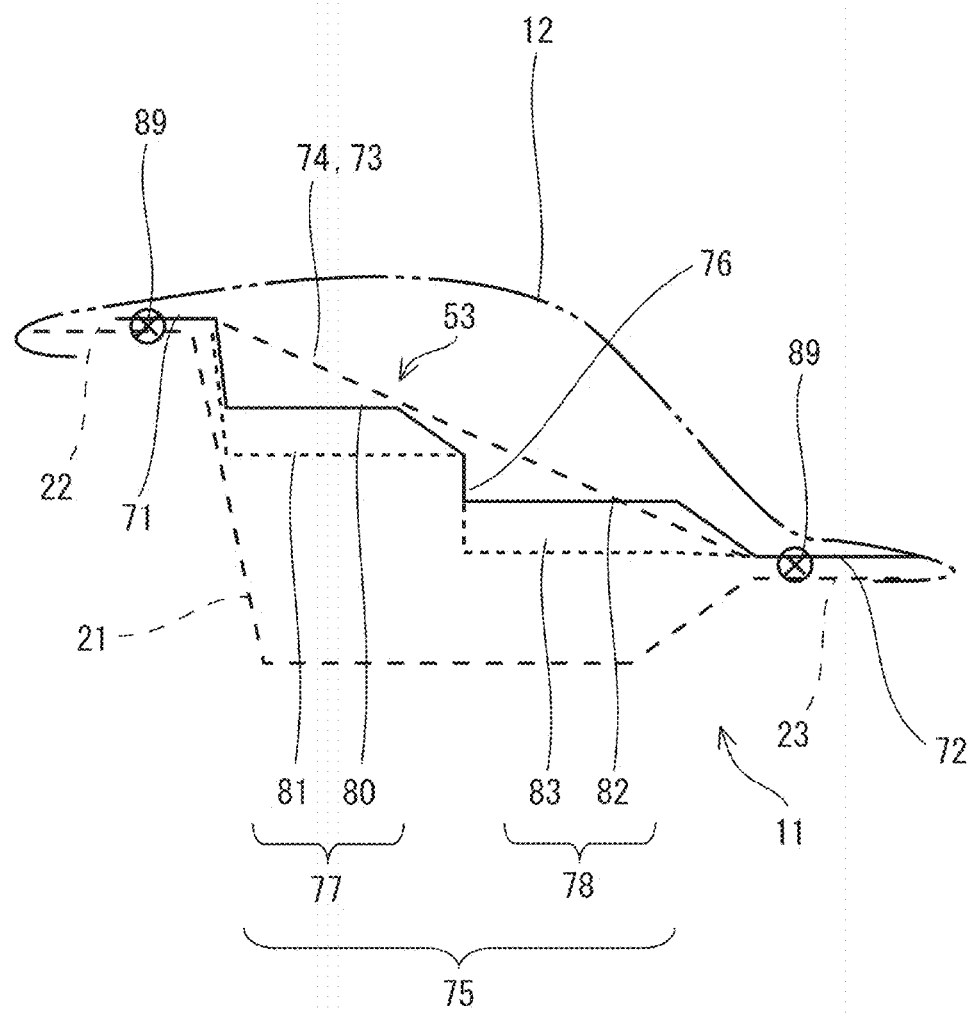
FIG. 10 is a cross-sectional view of the upper left stiffening plate and the inner panel in FIG. 9.

FIG. 10 is a cross-sectional view of the upper left stiffening plate 53 and the inner panel 11 of FIG. 9. FIG. 10 illustrates an A-A cross section, a B-B cross section, and a C-C cross section of FIG. 8. Further, FIG. 10 also illustrates the outer panel 12 of the rear gate 10.

The upper left stiffening plate 53 provides a stiffening structure by a multistage structure of the protrusions 80 of the curved upper surface portion 77 and the protrusions 82 of the curved lower surface portion 78 in the A-A cross section with respect to the outer edge connecting surface portion 73 of the inner panel 11.

Further, the upper left stiffening plate 53 provides a stiffening structure by a multistage structure using the recess 81 of the curved upper surface portion 77 and the recess 83 of the curved lower surface portion 78 in the B-B cross section with respect to the outer edge connecting surface portion 73 of the inner panel 11. The multistage structure of the B-B cross section has a height different from that of the multistage structure of the A-A cross section.

In addition, the upper left stiffening plate 53 provides a planar stiffening structure by the outer edge connecting surface portion 73 of the C-C cross section between the outer peripheral edge 22 of the inner panel 11 and the window peripheral edge 23. Between one junction 89 of the curved upper edge junction 71 and one junction 89 of the curved lower edge junction 72, a planar stiffening structure is provided by the outer edge connecting surface portion 73. The outer edge connecting surface portion 73 and the inner edge connecting surface portion 74 can provide a separator structure at both ends in the longitudinal direction of the upper left stiffening plate 53 having the curved long plate shape. The separator structure at both ends of the upper left stiffening plate 53 makes it difficult for the cross section between the upper left stiffening plate 53 and the inner panel 11 to collapse.

With such a combination of the junctions 89, the upper left stiffening plate 53 can suppress twisting or bending of the outer peripheral skeleton part 21 of the inner panel 11 so that the interval between the outer peripheral edge 22 of the inner panel 11 and the window peripheral edge 23 changes with respect to the inner panel 11.

As described above, according to the present embodiment, since the stiffening plates such as the upper left stiffening plate 53 and the upper right stiffening plate 54 are joined to the inner panel 11, the rigidity of the rear gate 10 can be increased by the inner panel 11 and the stiffening plates. Moreover, since the rigidity of the rear gate 10 is increased by the inner panel 11 and the stiffening plate, the outer panel 12 can be formed so as to ensure the design of the rear gate 10.

Moreover, the stiffening plates such as the upper left stiffening plate 53 and the upper right stiffening plate 54 of the present embodiment have a curved long plate shape having an outer shape curved in a substantially L shape along the upper corner portion of the outer peripheral skeleton part 21 formed in the inner panel 11. In addition, the stiffening plates such as the upper left stiffening plate 53 and the upper right stiffening plate 54 overlap the upper corner portion of the outer peripheral skeleton part 21. In addition, the stiffening plate having a curved long plate shape includes the curved recess 75 formed by curving a portion surrounded by a frame part formed by the curved upper edge junction 71 serving as an upper edge in the curved long plate shape, the curved upper edge junction 71 serving as a lower edge in the curved long plate shape, and the outer edge connecting surface portions 73 and the inner edge connecting surface portions 74 serving as both edges in the longitudinal direction in the curved long plate shape in a recessed shape toward the outer peripheral skeleton part 21. Although the stiffening plate itself is formed in a curved long plate shape, the three-dimensional structure in which the curved recess 75 is formed inside a planar outer frame makes it difficult for the stiffening plate to be twisted or bent by an external force.

Then, the curved upper edge junction 71 of the stiffening plate having such a three-dimensional structure is joined to the outer adjacent portion of the inner panel 11 adjacent to the outer peripheral skeleton part 21 at least in the portion on the extension of the outer edge connecting surface portion 73 and the portion on the extension of the inner edge connecting surface portion 74. Further, the curved lower edge junction 72 is joined to an inner adjacent portion of the inner panel 11 adjacent to the outer peripheral skeleton part 21 at least in the portion on the extension of the outer edge connecting surface portion 73 and the portion on the extension of the inner edge connecting surface portion 74. Thus, the outer edge connecting surface portion 73 and the inner edge connecting surface portion 74 are provided so as to bridge on the inside of the outer peripheral skeleton part 21 on which the stiffening plates are overlapped. The outer edge connecting surface portion 73 and the inner edge connecting surface portion 74 are both edge portions in the longitudinal direction of the stiffening plate having a curved long plate shape. Therefore, the outer edge connecting surface portion 73 bridges the inside of the outer peripheral skeleton part 21 in a portion extending in a vertical direction in the outer peripheral skeleton part 21 formed along the outer peripheral edge of the inner panel 11. On the other hand, the inner edge connecting surface portion 74 bridges the inside of the outer peripheral skeleton part 21 in a portion extending in a lateral direction in the outer peripheral skeleton part 21 formed along the outer peripheral edge of the inner panel 11. As a result, the outer peripheral skeleton part 21 formed along the outer peripheral edge of the inner panel 11 is less likely to be deformed in cross section in such a manner that the inner cross-sectional area of the outer peripheral skeleton part 21 increases or decreases in the portion extending in the vertical direction and the portion extending in the lateral direction with respect to the upper corner portion. The outer peripheral skeleton part 21 formed along the outer peripheral edge of the inner panel 11 is less likely to be twisted or bent at the upper corner portion even when an external force acts.

In the present embodiment, for example, the left hinge attachment part 31 for the left hinge member 6 for supporting the rear gate 10 of the automobile 1 so as to be openable and closable to the vehicle body 2 is formed in an outer portion of the outer peripheral skeleton part 21 in the inner panel 11. The stiffening plates such as the upper left stiffening plate 53 and the upper right stiffening plate 54 are provided from the upper corner portion of the outer peripheral skeleton part 21 to the attachment part of the hinge member 6 so as to overlap the upper corner portion of the outer peripheral skeleton part 21. The curved upper edge junction 71 overlaps the left hinge attachment part 31, and is screwed to the left hinge member 6 together with the left hinge attachment part 31.

Thus, a force that can act on the left hinge attachment part 31 of the rear gate 10 from the left hinge member 6 when the rear gate 10 is opened and closed can act on the inner panel 11 and the stiffening plate having a three-dimensional structure joined to the inner panel 11. A significant cross section can be formed between the outer peripheral skeleton part 21 of the inner panel 11 and the stiffening plate having a three-dimensional structure. Further, the stiffening plate joined to the inner panel 11 has a three-dimensional structure that is less likely to be twisted or bent.

In the present embodiment, the curved recesses 75 of the stiffening plates such as the upper left stiffening plate 53 and the upper right stiffening plate 54 are formed in a multistage structure including the curved upper surface portion 77, the curved step portion 76, and the curved lower surface portion 78. Thus, the stiffening plates are less likely to be twisted or bent by the force of opening and closing the rear gate 10. As a result, the upper corner portion of the outer peripheral skeleton part 21 formed along the outer peripheral edge of the inner panel 11 serves so to be less likely to be twisted or bent.

In addition, by forming the stiffening plate in a multistage structure, as illustrated in FIG. 10, a gap can be ensured between the stiffening plate and the outer peripheral skeleton part 21, and a cross-sectional area can be ensured. The second moment of area after the stiffening can be increased.

Due to these effects, the upper corner portion of the inner panel 11 is less likely to be twisted or bent as compared with a case where the curved recess 75 of the stiffening plate such as the upper left stiffening plate 53 or the upper right stiffening plate 54 is formed in a simple cross section.

In the curved recess 75 of the stiffening plate such as the upper left stiffening plate 53 and the upper right stiffening plate 54 of the present embodiment, the curved upper surface portion 77 has a recess-protrusion surface shape in which the recesses 81 and the protrusions 80 are alternately arranged in the longitudinal direction of the curved upper surface portion 77. Further, the curved lower surface portion 78 has a recess-protrusion surface shape in which the recesses 83 and the protrusions 82 are alternately arranged in the longitudinal direction of the curved lower surface portion 78. Thus, the curved recess 75 having the multi-step structure is less likely to be twisted or bent as compared with a case where the curved upper surface portion 77 or the curved lower surface portion 78 is formed in a planar shape. In the present embodiment, surface deformation of the curved upper surface portion 77 and the curved lower surface portion 78 can be suppressed.

In the present embodiment, the curved lower edge junction 72 overlaps the window peripheral edge 23 that is a peripheral edge portion around the glass opening 20, and is bonded to the inner panel 11 at the window peripheral edge 23. Here, the window peripheral edge 23 is an inner adjacent portion adjacent to the outer peripheral skeleton part 21. Thus, the curved lower edge junction 72 of the stiffening plates such as the upper left stiffening plate 53 and the upper right stiffening plate 54 is less likely to be twisted or bent.

As described above, in the present embodiment, the rigidity of the rear gate 10 can be enhanced while ensuring the design of the rear gate 10.

For example, when the rear gate 10 is opened and closed, the force Fa in FIG. 4 or the like is input to the lower edge central portion of the rear gate 10.

A part of this force Fa can be transmitted to the hinge portion such as the left hinge attachment part 31 through, for example, the outer peripheral skeleton part 21. At this time, the outer peripheral skeleton part 21 is easily deformed in such a manner that a lower portion thereof is bent with respect to an upper portion. A force that twists the left and right edge portions of the outer peripheral skeleton part 21 easily acts on the upper left corner portion or the upper right corner portion of the outer peripheral skeleton part 21 around the upper portion extending in the left-right direction with respect to the outer peripheral skeleton part 21.

In the present embodiment, the upper left stiffening plate 53 is joined to the upper left corner portion of the outer peripheral skeleton part 21, and the upper right stiffening plate 54 is joined to the upper right corner portion of the outer peripheral skeleton part 21. As a result, torsional deformation can be suppressed as described above.

As a result, in the present embodiment, the rear gate 10 formed by overlapping the inner panel 11 and the outer panel 12 is less likely to flex or bend by the input of the force Fa. For example, the upper portion of the rear gate 10 itself is less likely to flex or bend.

Other than this, for example, the occupant may input the force Fd of FIG. 3 to the rear gate 10. Such a lateral input Fd may generate a force Fr that rotates the rear gate 10 in the plane of the rear gate 10. As a result, the rear gate 10 may flex in such a manner that its entirety deforms from a quadrangle to a parallelogram.

However, in the present embodiment, the upper left stiffening plate 53 is joined to the upper left corner portion of the outer peripheral skeleton part 21, and the upper right stiffening plate 54 is joined to the upper right corner portion of the outer peripheral skeleton part 21. Thus, the rear gate 10 is less likely to bend so that the entire rear gate is deformed from a quadrangle to a parallelogram.

The above embodiments are examples of preferred embodiments of the disclosure, but the disclosure is not limited thereto, and various modifications or changes can be made without departing from the gist of the disclosure.

Figure 11:
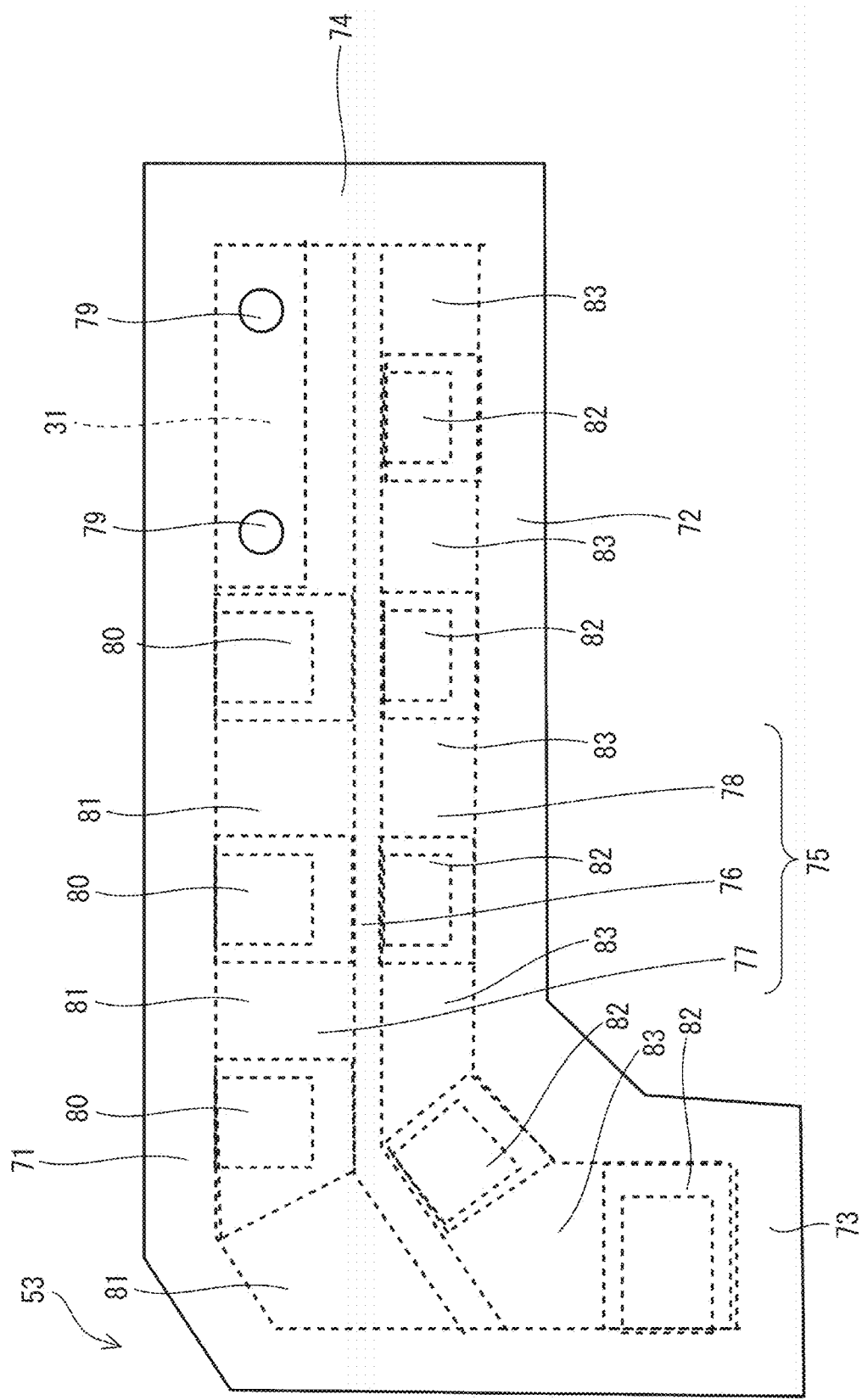
FIG. 11 is a schematic explanatory view of a modification of the upper left stiffening plate of FIG. 8.

FIG. 11 is a schematic explanatory view of a modification of the upper left stiffening plate 53 in FIG. 8.

In the upper left stiffening plate 53 of FIG. 11, unlike FIG. 8, the curved step portion 76 is not formed over the entire longitudinal direction of the curved recess 75 of the curved long plate shape, but is formed only in the linear portion of the curved recess 75. The curved upper surface portion 77 is formed on the upper side of the curved step portion 76, and the curved lower surface portion 78 is formed on the lower side.

In addition, various holes for improving maintenance and workability may be appropriately formed in the curved upper surface portion 77 and the curved lower surface portion 78.

Even in the upper left stiffening plate 53 according to such a modification, a stiffening effect equivalent to that of the above-described embodiment can be expected.

The invention claimed is:

1. A rear gate structure of a vehicle, the rear gate structure being configured to open and close a rear opening of a vehicle body of the vehicle, the rear gate structure comprising:
   an outer panel constituting an outer surface of the vehicle by the rear gate;
   an inner panel provided inside the vehicle with respect to the outer panel, at least an outer peripheral edge of the inner panel being joined to the outer panel;
   an outer peripheral skeleton part formed on the inner panel along an outer peripheral edge of the inner panel; and
   a stiffening plate that overlaps the outer peripheral skeleton part,
   wherein the stiffening plate has a curved long plate shape having an outer shape that is provided so as to overlap an upper corner portion of the outer peripheral skeleton part and is curved along the upper corner portion of the outer peripheral skeleton part, and is provided with a curved recess that is formed by curving, in a recessed shape, a portion surrounded by a frame part, the frame part comprising a curved upper edge junction curved at an upper edge in the curved long plate shape, a curved lower edge junction curved at a lower edge in the curved long plate shape, and an outer edge connecting surface portion and an inner edge connecting surface portion serving as both edges in a longitudinal direction in the curved long plate shape,
   wherein the curved recess includes a curved step portion extending along a longitudinal direction of the curved recess, the curved step portion forming a curved upper surface portion on an upper side of the curved step portion and a curved lower surface portion on a lower side of the curved step portion, the curved upper surface portion and the curved lower surface portion being at different depths to form a multistage structure,
   wherein the curved upper surface portion has a bead shape comprising an uneven surface in which recesses and protrusions are alternately arranged in a longitudinal direction of the curved upper surface portion, and the curved lower surface portion has a bead shape comprising an uneven surface in which recesses and protrusions are alternately arranged in a longitudinal direction of the curved lower surface portion,
   wherein the curved upper edge junction is joined to an outer adjacent portion of the inner panel adjacent to the outer peripheral skeleton part, at least in a portion on an extension of the outer edge connecting surface portion and a portion on an extension of the inner edge connecting surface portion, and
   wherein the curved lower edge junction is joined to an inner adjacent portion of the inner panel adjacent to the outer peripheral skeleton part, at least in a portion on the extension of the outer edge connecting surface portion and the portion on the extension of the inner edge connecting surface portion.

2. The rear gate structure of the vehicle according to claim 1, wherein
   the inner panel is provided, in an outer portion of the outer peripheral skeleton part, with an attachment part of a hinge member for supporting the rear gate of the vehicle so as to be openable and closable to the vehicle body, and
   the stiffening plate is provided so as to overlap an upper corner portion of the outer peripheral skeleton part from the upper corner portion of the outer peripheral skeleton part to an attachment part of the hinge member, and the curved upper edge junction overlaps the attachment part, and is screwed to the hinge member together with the attachment part.

3. The rear gate structure of the vehicle according to claim 2, wherein the outer panel and the inner panel respectively have a first glass opening and a second glass opening in which a rear glass of the vehicle is disposed, and a first peripheral edge portion around the first glass opening and a second peripheral edge portion around the second glass opening are joined to each other, and the curved lower edge junction overlaps the second peripheral edge portion as an inner adjacent portion adjacent to the outer peripheral skeleton part, and is joined to the inner panel at the second peripheral edge portion.

4. The rear gate structure of the vehicle according to claim 3, wherein the outer peripheral skeleton part is annularly formed in the inner panel along the outer peripheral edge of the inner panel, and wherein the stiffening plate overlapping the outer peripheral skeleton part comprises an upper left stiffening plate provided at an upper left corner portion of the annular outer peripheral skeleton part and an upper right stiffening plate provided at an upper right corner portion of the annular outer peripheral skeleton part, wherein the rear gate structure further comprises additional stiffening plates overlapping the outer peripheral skeleton part, the additional stiffening plates comprising:

left stiffening plate provided at a left edge portion of the annular outer peripheral skeleton part, right stiffening plate provided at a right edge portion of the annular outer peripheral skeleton part, and lower stiffening plate provided at a lower edge portion of the annular outer peripheral skeleton part, and wherein the upper left stiffening plate and the upper right stiffening plate are formed in the curved long plate shape.

5. The rear gate structure of the vehicle according to claim 2, wherein the outer peripheral skeleton part is annularly formed in the inner panel along the outer peripheral edge of the inner panel, and wherein the stiffening plate overlapping the outer peripheral skeleton part comprises an upper left stiffening plate provided at an upper left corner portion of the annular outer peripheral skeleton part and an upper right stiffening plate provided at an upper right corner portion of the annular outer peripheral skeleton part, wherein the rear gate structure further comprises additional stiffening plates overlapping the outer peripheral skeleton part, the additional stiffening plates comprising:

left stiffening plate provided at a left edge portion of the annular outer peripheral skeleton part, right stiffening plate provided at a right edge portion of the annular outer peripheral skeleton part, and lower stiffening plate provided at a lower edge portion of the annular outer peripheral skeleton part, and wherein the upper left stiffening plate and the upper right stiffening plate are formed in the curved long plate shape.

6. The rear gate structure of the vehicle according to claim 1, wherein the outer peripheral skeleton part is annularly formed in the inner panel along the outer peripheral edge of the inner panel, and wherein the stiffening plate overlapping the outer peripheral skeleton part comprises an upper left stiffening plate provided at an upper left corner portion of the annular outer peripheral skeleton part and an upper right stiffening plate provided at an upper right corner portion of the annular outer peripheral skeleton part, wherein the rear gate structure further comprises additional stiffening plates overlapping the outer peripheral skeleton part, the additional stiffening plates comprising:

left stiffening plate provided at a left edge portion of the annular outer peripheral skeleton part, right stiffening plate provided at a right edge portion of the annular outer peripheral skeleton part, and lower stiffening plate provided at a lower edge portion of the annular outer peripheral skeleton part, and wherein the upper left stiffening plate and the upper right stiffening plate are formed in the curved long plate shape.

7. The rear gate structure of the vehicle according to claim 1, wherein the inner panel includes a left hinge attachment part and a right hinge attachment part disposed on an outer portion of the outer peripheral skeleton part, the left hinge attachment part and the right hinge attachment part being configured to attach a left hinge member and a right hinge member, respectively, to support the rear gate so as to be openable and closable to the vehicle body.

8. The rear gate structure of the vehicle according to claim 7, wherein the upper left stiffening plate overlaps the left hinge attachment part, wherein the upper right stiffening plate overlaps the right hinge attachment part, and wherein each of the upper left stiffening plate and the upper right stiffening plate are screwed to the respective hinge member together with the respective hinge attachment part.

9. The rear gate structure of the vehicle according to claim 1, wherein the outer peripheral skeleton part is annularly formed along the outer peripheral edge of the inner panel, and wherein the stiffening plate includes:

a left stiffening plate provided at a left edge portion of the outer peripheral skeleton part;

a right stiffening plate provided at a right edge portion of the outer peripheral skeleton part; and a lower stiffening plate provided at a lower edge portion of the outer peripheral skeleton part.

10. The rear gate structure of the vehicle according to claim 9, wherein the left stiffening plate and the right stiffening plate each have a substantially rectangular shape and overlap a respective cylinder attachment part configured to attach a cylinder member to the inner panel, the cylinder member coupling the rear gate to the vehicle body.

11. The rear gate structure of the vehicle according to claim 9, wherein the lower stiffening plate has a substantially rectangular shape and overlaps a striker attachment part configured to attach a striker member to the inner panel, and wherein the striker member is engageable with a latch member on the vehicle body to maintain the rear gate in a closed state.

12. The rear gate structure of the vehicle according to claim 1, wherein the inner panel includes at least one inner skeleton part formed inside the outer peripheral skeleton part, the at least one inner skeleton part having a hat cross-sectional shape and being connected to the outer peripheral skeleton part with a step such that a bottom surface portion of the at least one inner skeleton part is offset from a bottom surface portion of the outer peripheral skeleton part.

13. The rear gate structure of the vehicle according to claim 12, wherein the at least one inner skeleton part includes:
   a left oblique inner skeleton part extending obliquely from a lower portion of the inner panel to the left edge portion of the outer peripheral skeleton part; and
   a right oblique inner skeleton part extending obliquely from the lower portion of the inner panel to the right edge portion of the outer peripheral skeleton part.

14. The rear gate structure of the vehicle according to claim 13, wherein a left stiffening plate overlaps a connecting portion between the outer peripheral skeleton part and an upper end portion of the left oblique inner skeleton part, and
   wherein a right stiffening plate overlaps a connecting portion between the outer peripheral skeleton part and an upper end portion of the right oblique inner skeleton part.

15. The rear gate structure of the vehicle according to claim 1, wherein the stiffening plate is joined to the inner panel by spot welding at the curved upper edge junction and the curved lower edge junction, and is sandwiched between the inner panel and the outer panel to enhance rigidity of the rear gate.

16. The rear gate structure of the vehicle according to claim 1, wherein the stiffening plate is configured to suppress torsional deformation of the outer peripheral skeleton part when a lateral force is applied to the rear gate, preventing the rear gate from deforming from a quadrangular shape to a parallelogram shape.

* * * * *